July 6, 1926.
E. G. McCAULEY ET AL
1,591,638
UNIVERSAL TAIL SKID
Filed March 29, 1923
2 Sheets-Sheet 1
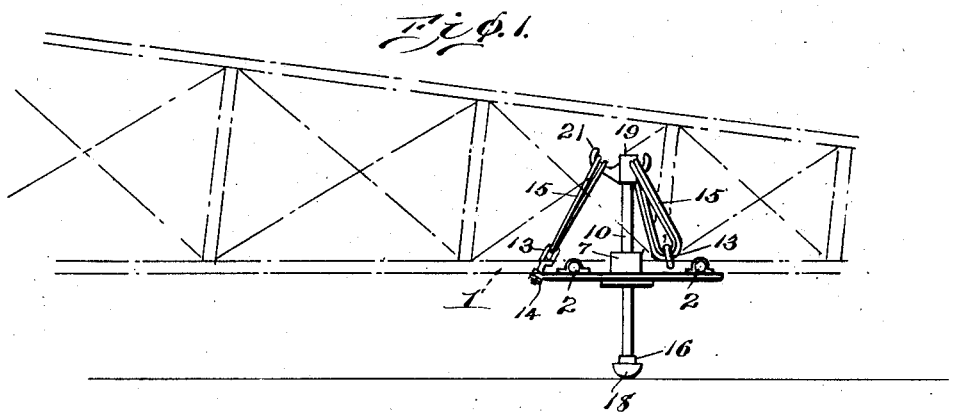
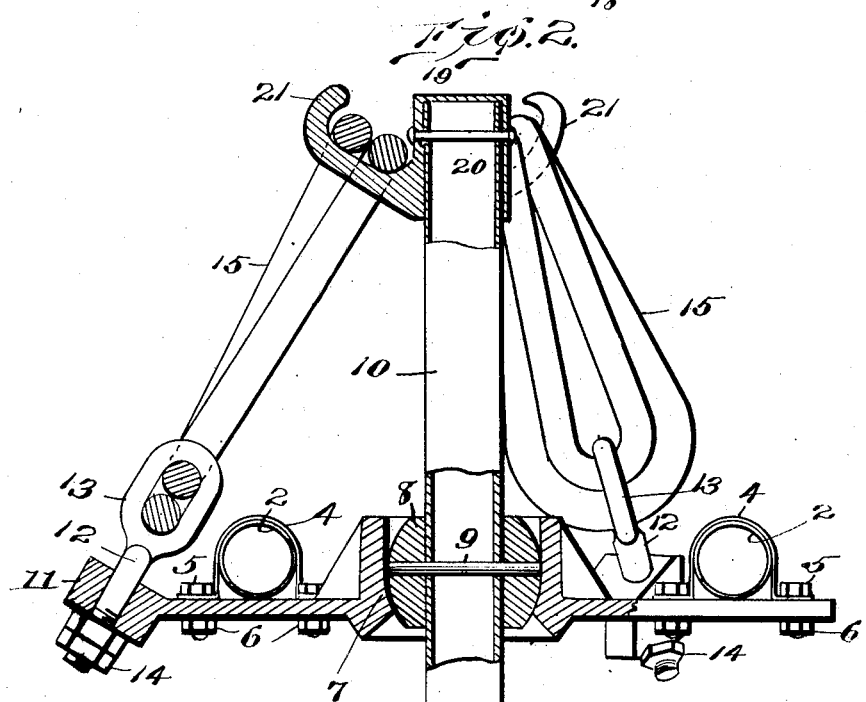

July 6, 1926.
E. G. McCAULEY ET AL
1,591,638
UNIVERSAL TAIL SKID
Filed March 29, 1923
2 Sheets-Sheet 2
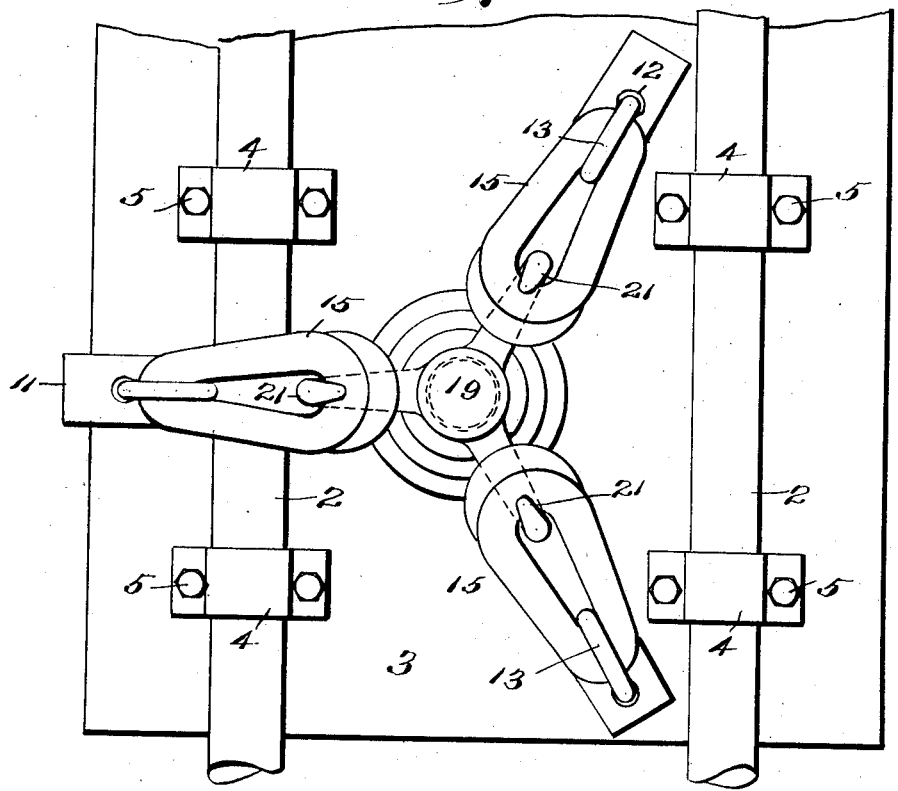
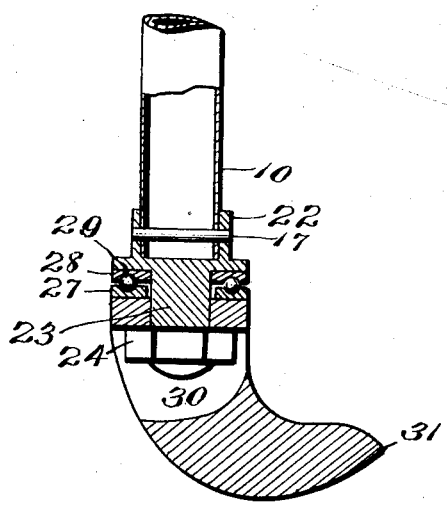
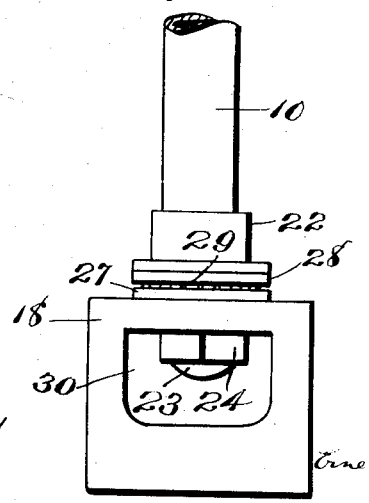
Inventors
Ernest G. McCauley
and
Frank W. Caldwell
By Robert A. Young Attorney Patented July 6, 1926.

1,591,638

UNITED STATES PATENT OFFICE.

ERNEST G. McCAULEY AND FRANK W. CALDWELL, OF DAYTON, OHIO.

UNIVERSAL TAIL SKID.

Application filed March 29, 1923. Serial No. 628,500.

This invention relates to improvements in tail skids for aircraft, and has for its main object the provision of a tail skid that will absorb shock and function in any direction correspondingly to that of the shock imposed upon the shoe of the tail skid.

Another object is to provide a swivel action on the vertical post by means of a ball and socket connection, to allow the post to tilt and function in any direction caused by the path in which the aircraft may move on the ground.

This feature is especially desirable when used in an aircraft having a reversible propeller, as the conventional tail skid will only function when aircraft is moving forward, as a reverse movement of the aircraft will cause the tail skid to dig into the ground and consequently break off, which occurrence has actually happened with the use of reversible propellers.

This possibility is eliminated by the use of the proposed tail skid as it is free to swivel in a ball and socket connection to any position simultaneously and in relation to the direction of the path of the moving aircraft. It is found that a vertical tail skid provides more ample means for taxiing as the vertical skid will act as a pivot for the turning aircraft rather than a side drag as is exerted by the conventional skid. By replacing a round shoe with a swiveled shoe, a further advantage is gained by allowing the end of the skid resting against the ground to swivel into the direction necessary to prevent the skid from digging into the ground at any time.

Shock absorbing means are to be attached to the vertical tail skid provided with means for adjusting the tension necessary to retain the skid in the proper position and further to provide a suitable cushioning effect for the aircraft when landing.

With the foregoing and other objects in view, the present invention resides in the combination of parts and in the details of construction hereinafter described and claimed, it being understood that changes may be made within the scope of the appended claims, in the precise embodiments as illustrated in the accompanying drawings in which—

Figure 1 is a longitudinal section through a portion of the fuselage of an aircraft, showing the tail skid attached thereto;

Figure 2 is a front elevation, partly in section, of the tail skid showing its attachment to a retaining plate and shock absorbing means;

Figure 3 is a top plan view of the tail skid assembly;

Figure 4 is a vertical section through the tail skid showing a modified form of tail skid shoe;

Figure 5 is a front elevation of the same form of skid and shoe shown in Fig. 4.

Referring more particularly to the drawings, the lower longérons 1 of the fuselage have attached thereto a substantially rectangular plate 3 having cross tubes 2 retained thereon by straps 4 and bolts 5 and nuts 6.

The plate 3 is provided with a centrally disposed interiorly curved collar 7 which acts as a socket for the ball 8 to form a universal connection. The tail skid post 10 passes through the ball 8 and is attached thereto by a cross pin 9 extending through both.

The plate 3 is further provided at preferably three points near its periphery with centrally apertured lugs 11 to receive bolts 12 with loops 13 integral therewith, and nuts 14 to retain said bolts 12 in said lugs 11.

A cap member 19 is placed over the top of the post 10 and held thereon by means of a pin 20. Cap 19 extends downwardly around a portion of the post 10 and has integral upwardly curved lugs 21, preferably three in number to correspond to lugs 11. Elastic shock absorbing members 15 are passed through loops 13 and engage behind lugs 21, the tension of the extended shock absorbing cords 15 being adjustable by means of the adjusting nuts 14 on the screw bolts 14.

As shown in Figs. 1 and 2 a shoe 18 having an extension 16 is fastened to the post 10 by means of a cross pin 17. This constitutes a stationary, non-rotating shoe for the vertical post 10.

A further advantageous form of shoe is illustrated in Figs. 4 and 5. A detachable post 23 has a hollow extension 22 to receive the lower end of the post 10 which is retained therein by means of a cross pin 17. The post 23 passes into the shoe 25 and is provided with screw threads to receive the retaining nut 24, there being further provided a recess 30 in the shoe 25, ample for releasing the nut 24 and consequently the entire shoe at will. The shoe 25 is free to revolve about the post 23 and the main tail skid post 10 attached thereto, and is further provided with an upper and lower ball race 28 and 27 and ball bearings 29 therebetween to facilitate rotation of said tail skid shoe 25.

The entire tail skid assembly may be constructed and arranged and subsequently attached to the lower longérons of the fuselage. The shock absorbing cords may be readily adjusted by adjusting the nuts 14. Regardless of the direction of movement of the tail of the aircraft the projection 31 of the shoe 25 will trail behind the remainder of the shoe by reason of being mounted free to rotate on the post 23. The ball and socket joint comprising ball 8 and socket 7 allows the post 10 to oscillate around said joint as a pivot while the shock absorbing cords 15, absorb the shock to which the skid is subjected and tend to keep said skid in vertical position.

What we claim is—

1. In an aircraft including a fuselage, a tail skid, a base plate supporting said skid, resilient means in the fuselage joining the base plate at triangular points thereon, and adjusting means for said resilient means operable exteriorly of the fuselage and at each point.

2. In an aircraft, a skid including a vertical post pivotally mounted on said aircraft intermediate the ends of said post.

3. In an aircraft, a vertical tail skid provided with a base plate for mounting said tail skid, adjustable shock absorbing means connected to and extending between said base plate and the upper end of the post of said tail skid.

4. In an aircraft, a fuselage, a base plate connected to said fuselage, a vertical tail skid provided with a ball on the post of said skid, a socket in said base plate to receive said ball to form a ball and socket joint, shock absorbing means extending between and connected to said base plate and the top of said tail skid post, and a shoe detachably connected to the lower end of said post.

5. In an aircraft, a fuselage, a base plate connected to said fuselage, a vertical tail skid provided with a ball on the post of said skid, a socket in said base plate to receive said ball, to form a ball and socket joint shock absorbing means extending between and connected to said base plate and the top of said tail skid post, and a shoe detachably connected to the lower end of said post, said shoe being rotatably mounted thereon and provided with a frictionless bearing and adapted to rotate independently of said tail post.

6. In an aircraft, a base plate, a tail skid provided with resilient shock absorbing means consisting of multiple shock absorbing connections attached to the post of said tail skid and said base plate to allow said tail skid to swivel under tension of said shock absorbing means and retain said tail post in substantially vertical position.

7. In an aircraft, a skid including a vertical post capable of swinging movement in any direction relative to said aircraft.

8. In an aircraft a skid including a vertical post and a universal connection between said post and said aircraft.

9. In an aircraft, a skid including a post pivotally mounted on said aircraft intermediate the ends of said post, said post being normally held in a vertical position by a plurality of angularly disposed resilient means.

10. In an aircraft, a skid including a post pivotally mounted on said aircraft intermediate the ends of said post, said post being normally held in a vertical position by a plurality of angularly disposed resilient means, and means operable exteriorly of said fuselage for adjusting the tension of said resilient means.

11. In an aircraft, a skid including a vertical post capable of swinging movement in any direction relative to said aircraft, resilient means normally holding said post in its vertical position, and means for adjusting the tension of said resilient means.

12. In an aircraft, a skid including a vertical post and having a universal connection between said post and said aircraft, resilient means tending to hold said post in its vertical position and means for adjusting the tension of said resilient means.

In testimony whereof we affix our signatures.

ERNEST G. McCAULEY.
FRANK W. CALDWELL.